United States Patent [19]

Tamura

[11] 4,013,588

[45] Mar. 22, 1977

[54] OXIDATION CATALYST FOR REMOVAL OF NITROGEN MONOXIDE IN EXHAUST GAS

[75] Inventor: Takaaki Tamura, Tokyo, Japan

[73] Assignee: Kogyo Kaihatus Kenkyusho (Industrial Research Institute), Tokyo, Japan

[22] Filed: May 6, 1974

[21] Appl. No.: 467,085

[30] Foreign Application Priority Data

| May 12, 1973 | Japan | 48-52826 |
|---|---|---|
| May 12, 1973 | Japan | 48-52827 |
| May 12, 1973 | Japan | 48-52828 |
| May 12, 1973 | Japan | 48-52829 |

[52] U.S. Cl. .......................... 252/454; 252/455 Z; 423/239
[51] Int. Cl.$^2$ ..................... B01J 29/00; B01J 29/06
[58] Field of Search ........... 252/455 R, 454, 455 Z; 423/239

[56] References Cited

UNITED STATES PATENTS

| 3,436,356 | 4/1969 | Kato et al. | 252/450 |
|---|---|---|---|
| 3,476,508 | 11/1969 | Kearby et al. | 252/455 Z |
| 3,498,743 | 3/1970 | Kyllonen | 423/239 |
| 3,498,928 | 3/1970 | Cho et al. | 252/455 Z |
| 3,545,917 | 12/1970 | Stephens | 423/239 X |
| 3,864,450 | 2/1975 | Takeyama et al. | 423/239 |
| 3,880,618 | 4/1975 | McCrea et al. | 423/239 X |

*Primary Examiner*—Carl F. Dees
*Attorney, Agent, or Firm*—Burgess Ryan and Wayne

[57] ABSTRACT

The oxidation catalyst of this application is prepared by grinding and heat treating the tuff consisting essentially of $SiO_2$, $Al_2O_3$ and $H_2O$, and containing a total of 1 to 10% by weight of an alkaline metal oxide and alkaline earth metal oxide and having the X-ray diffraction pattern shown in the Table I or Table II. This catalyst eliminates NO in a dry exhaust gas which contains at least a small amount of oxygen.

5 Claims, No Drawings

OXIDATION CATALYST FOR REMOVAL OF NITROGEN MONOXIDE IN EXHAUST GAS

The present invention relates to a novel oxidation catalyst and a method for removal of nitrogen monoxide (hereinafter referred to as "NO" throughout the present specification) by oxidation adsorption of NO using the novel oxidation catalyst.

The air pollution prevention standard has recently become stringent and its allowance with respect to $NO_x$ (nitrogen oxides) has also become more stringent. According to the present standard for several cities in Japan, for example, in usual boilers, when coal is employed as a fuel source, an average $NO_x$ concentration should be less than 400 ppm, 300 ppm in heavy oil and 200 ppm in liquefied natural gas, is permitted in the exhaust gas. At that time, the upper limit of the $NO_x$ where the $NO_x$ reaches the atmosphere is about 0.1 ppm. However, it is likely that the upper limit of permissible $NO_x$ would be raised to be 0.02 ppm in the near future. In order to meet this stricter limit, more than at least 80% of $NO_x$ presently exhausted should be eliminated at the source of the exhaust gas.

It is especially difficult to remove $NO_x$ in exhaust gas from boilers since the exhaust gas which has low $NO_x$ concentration must be treated on a large scale and the presence of $SO_2$, $CO$, $O_2$, etc. in the exhaust would prevents denitration.

$NO_x$ is mainly composed of NO and $NO_2$ (nitrogen dioxide). Various attempts have been made to remove these nitrogen oxides. Generally, adsorbents such as a molecular sieve, activated charcoal, etc. have been employed in the known methods to remove $NO_x$. However, since the known adsorbents have a slow adsorption rate and are generally employed at low temperatures, e.g., about room temperature, these adsorbents are unsuitable for the application to exhaust gas having an NO content of several hundred ppm, e.g., from boilers. Furthermore, the only $NO_x$ other than NO is adsorbed but NO is not eliminated in the known adsorption methods. In addition, these known adsorbents are expensive and as a result serious difficulties are encountered when they are employed in commercial use. Especially, there is no possibility of lowering the cost of a molecular sieve in the future.

I have examined various kinds of materials and found that although little effect has been obtained in ordinary air containing moisture, when a dry gaseous mixture containing NO to which a small amount of oxygen is added is contacted with various kinds of materials including known adsorbents, a small amount of NO is removed from the gaseous mixture. I have also found that a specific naturally occurring inorganic material defined hereinafter has a surprisingly excellent effect in removing of NO from dry gaseous mixtures. It was surprising that the naturally occurring tuff showed an adsorption efficiency of 100 times or more, or 1000 times or more under specific conditions, as compared with known adsorbents such as a molecular sieve or activated alumna.

An object of the present invention is to provide a novel oxidation catalyst which can oxidize NO readily and effectively in a simple manner to give $NO_2$.

A further object of the present invention is to provide a method for removal of NO using the novel oxidation catalyst in extremely high adsorption efficiency.

The oxidation catalyst in accordance with the present invention is prepared by grinding and heat treating a tuff, a naturally occurring inorganic material, consisting essentially of $SiO_2$, $Al_2O_3$ and $H_2O$, and containing a total of 1 to 10% by weight of an alkaline metal oxide and alkaline earth metal oxide.

The tuff employed in accordance with the present invention has the X-ray diffraction pattern shown in the following Table I or Table II.

Table I

| Interplanar Spacing A | Relative Intensities 10 I/I$_o$ | Interplanar Spacing A | Relative Intensities 10 I/I$_o$ |
|---|---|---|---|
| 13.9 ± 0.1 | 2 | 3.23 ± 0.03 | 6 |
| 9.1 ± 0.1 | 4 | 3.10 ± 0.03 | 0 – 1 |
| 6.6 ± 0.1 | 4 | 2.90 ± 0.03 | 3 |
| 6.5 ± 0.1 | 2 | 2.85 ± 0.03 | 0 – 2 |
| 6.1 ± 0.1 | 2 | 2.71 ± 0.03 | 1 |
| 5.83 ± 0.05 | 2 | 2.58 ± 0.03 | 1 |
| 4.55 ± 0.05 | 2 | 2.53 ± 0.03 | 2 |
| 4.30 ± 0.10 | 0 – 5 | 2.49 ± 0.03 | 0 – 4 |
| 4.26 ± 0.10 | 0 – 2 | 2.47 ± 0.03 | 0 – 3 |
| 4.08 ± 0.10 | 0 – 4 | 2.45 ± 0.03 | 0 – 2 |
| 4.05 ± 0.10 | 0 – 6 | 2.04 ± 0.03 | 2 |
| 4.01 ± 0.05 | 7 | 1.96 ± 0.03 | 1 |
| 3.85 ± 0.03 | 2 | 1.88 ± 0.02 | 1 |
| 3.81 ± 0.10 | 0 – 4 | 1.82 ± 0.02 | 1 |
| 3.77 ± 0.05 | 1 | 1.82 ± 0.02 | 0 – 2 |
| 3.48 ± 0.03 | 10 | 1.79 ± 0.02 | 1 |
| 3.40 ± 0.03 | 5 | 1.53 ± 0.02 | 1 |
| 3.35 ± 0.10 | 0 – 8 | | |

Table II

| Interplanar Spacing A | Relative Intensities 10 I/I$_o$ | Interplanar Spacing A | Relative Intensities 10 I/I$_o$ |
|---|---|---|---|
| 9.10 ± 0.1 | 7 | 3.18 ± 0.03 | 4 |
| 7.99 ± 0.1 | 4 | 3.15 ± 0.03 | 4 |
| 6.82 ± 0.1 | 2 | 2.99 ± 0.03 | 0 – 1 |
| 5.85 ± 0.08 | 5 | 2.98 ± 0.03 | 4 |
| 5.29 ± 0.08 | 2 | 2.89 ± 0.03 | 4 |
| 5.12 ± 0.05 | 3 | 2.85 ± 0.03 | 0 – 2 |
| 4.67 ± 0.05 | 2 | 2.81 ± 0.03 | 3 |
| 4.30 ± 0.10 | 0 – 5 | 2.74 ± 0.03 | 1 |
| 4.26 ± 0.10 | 0 – 2 | 2.53 ± 0.02 | 2 |
| 4.08 ± 0.10 | 0 – 4 | 2.49 ± 0.03 | 0 – 4 |
| 4.05 ± 0.10 | 0 – 6 | 2.47 ± 0.03 | 0 – 3 |
| 3.98 ± 0.05 | 10 | 2.46 ± 0.02 | 2 |
| 3.85 ± 0.05 | 2 | 2.45 ± 0.03 | 0 – 2 |
| 3.81 ± 0.10 | 0 – 4 | 2.02 ± 0.02 | 0.5 |
| 3.77 ± 0.05 | 2 | 1.95 ± 0.02 | 0.05 |
| 3.47 ± 0.03 | 7 | 1.87 ± 0.02 | 0.5 |
| 3.34 ± 0.10 | 0 – 8 | 1.81 ± 0.02 | 0 – 2 |
| 3.35 ± 0.03 | 5 | 1.72 ± 0.02 | 0.5 |
| 3.22 ± 0.03 | 4 | | |

The values of the position of the X-ray diffraction pattern and the specific intensity 10 I/Io may vary slightly depending upon the apparatus used for measuring the humidity and temperature at which the measurements are taken, and the manner of placing the crystals.

In obtaining the X-ray diffraction powder patterns, standard techniques were employed. The radiation was $K\alpha$ doublet of copper, and a Geiger counter spectrometer with a strip chart pen recorder was used. The peak heights, I, and the positions as a function of $2\theta$, where $\theta$ is the Bragg angle, were read from the spectrometer chart. From these, the relative intensities:

10 I/Io where Io is the intensity of the strongest line or peak and d(obs), the interplanar spacing in A, corresponding to the record lines, were calculated.

The material defined in Table I occurs mainly in the Tohoku and Chugoku districts in Japan and the material defined in Table II occurs in the Tohoku and Kyushu districts.

The naturally occurring inorganic material is ground into particles of, e.g., less than 50 mesh, preferably 3 – 5 mesh (mesh sizes quoted herein refer to the Tyler series) and this is followed by heat treatment to provide the oxidation catalyst of the present invention. The heating temperature is not overly critical, but in general ranges from 100° to 900° C, preferably 200° to 700° C. The heating is preferably conducted by blowing hot wind around the material in a tunnel furnace in the air while carrying the material by means of a belt conveyor.

The thus obtained oxidation catalyst is contacted with a dry gaseous mixture containing NO oxygen in a conventional manner, e.g., using a moving bed or a fixed bed.

The gaseous mixture to be contacted with the oxidation catalyst of the present invention contains NO and oxygen, at least. When exhaust gas from, e.g., a boiler, is employed, oxygen is usually present in the exhaust gas and hence it is unnecessary to add fresh oxygen to the exhaust gas. In case fresh oxygen is required, it can be supplied from pure oxygen or air. The oxygen concentration depends on the composition of the gaseous mixture, conditions of oxidation, etc. Accordingly, the oxygen concentration is not critical but a small amount of oxygen, e.g., 0.03% by volume to the total gas, is sufficient to attain effective removal of NO. The oxygen concentration influences the degree of removal of NO until 3% by volume. Phrased differently, the NO concentration at an outlet decreases as the oxygen concentration increases until 3%. When the oxygen concentration exceeds 3%, no substantial difference in the degree of removal of NO is detected as described hereinbelow. However, since oxygen is preferably provided from air, its upper limit is usually about 21% which is substantially the same concentration as in air.

It is required to eliminate moisture from the gaseous mixture since ordinary exhaust gas contains moisture which usually poisons the catalyst. While the drier gas is more effective in removal of NO, commercial interest dictates the range, which is generally the gas having a steam pressure of its dew point being less than 0° C, preferably less than −20° C. Drying of the gas is performed in a conventional manner, e.g., using silica gel, activated alumina or concentrated sulfuric acid, or in a freezing dry method. When exhaust gas is dried in accordance with a special method which I have devised, drying can more easily be conducted, e.g., until the gas indicates the steam pressure of a dew point being less than −50° C. However, such a degree of removal of NO can be controlled by a moving rate of the bed employed, retention time etc., it is not critical to what extent the gas should be dried.

While the mechanism of removal of NO is unclear, it is assumed that the oxidation catalyst employed in the present invention catalyzes the oxidation of NO to $NO_2$ and simultaneously serves as an adsorbent. That is, NO is once adsorbed on the oxidation catalyst. The adsorbed NO is oxidized by assistance of the oxidation catalyst to form $NO_2$. The active site for NO is thus unoccupied so that NO is continuously adsorbed on the oxidation catalyst. The catalyst tends to lower its activity as time lapses. This is because the accumulation of $NO_2$ appears to occur on the catalyst. However, the catalyst can easily be regenerated in a conventional manner, e.g., by heating to desorb as $NO_2$, by water washing to desorb mainly as nitric acid.

Specific examples of alkaline metal oxides and alkaline earth metal oxides which are usually contained in the naturally occurring tuff include $K_2O$, $Na_2O$ and $CaO$.

According to the present invention, the following advantages are obtained:

1. The rate of removal of NO is extremely superior;
2. Operation is simple and no special chemical knowledge is needed;
3. The oxidation catalyst can be reused; and
4. No concomitant secondary pollution is noted.

The present invention will further be explained with reference to the following examples but these examples should not be considered as limitative.

EXAMPLE 1

The naturally occurring inorganic material which satisfies the composition and the criterion of Table I described hereinabove was ground into 3 – 5 mesh. The ground material was heat treated at 400° – 600° C in air to obtain the oxidation catalyst.

The thus obtained catalyst of the present invention was filled up in an adsorption column having an inner diameter of 26 m/m $\phi$, and lengths of 80 m/m, 132 m/m and 290 m/m, respectively. Nitrogen gas having an adjusted NO concentration to 474 ppm was passed through the adsorption column to contact the catalyst. At the same time oxygen gas was incorporated into the nitrogen gas in various ratios. These gaseous mixtures were dried to have the steam pressure of a dew point being about −50° C. In addition thereto, testing at −20° C, 0° and +20° C was performed.

For the purpose of comparison, testing when using silica gel (dried at 120° C) and activated alumina (dried at 300° C) was also carried out. The NO concentration has been measured by the chemical luminescence method after checking by usual chemical analyse.

The results are shown below.

| Catalyst | $O_2$ concentration (%) | Linear velocity (cm/sec) | Space velocity (l/min) | NO concentration in outlet(ppm) | NO in outlet/NO in inlet(%) |
|---|---|---|---|---|---|
| Silica gel | 0.03 | 2.3 | 4.68 | 474 | 100 |
| " | 1.4 | " | " | 390 | 82.27 |
| " | 3.0 | " | " | 270 | 56.96 |
| " | 4.8 | " | " | 250 | 52.74 |
| Activated alumina | 0.03 | " | " | 395 | 83.33 |
| " | 1.4 | " | " | 78 | 16.45 |
| " | 3.0 | " | " | 35 | 7.38 |
| " | 4.8 | " | " | 18 | 3.79 |
| Catalyst of | | | | | |

-continued

| Catalyst | | $O_2$ concentration (%) | Linear velocity (cm/sec) | Space velocity (l/min) | NO concentration in outlet(ppm) | NO in outlet/NO in inlet(%) |
|---|---|---|---|---|---|---|
| this invention | (1) | 0.03 | 2.3 | 4.68 | 0.13 | 0.027 |
| " | (2) | 1.4 | " | " | 0.13 | 0.027 |
| " | (3) | 3.0 | " | " | 0.10 | 0.021 |
| " | (4) | 4.8 | " | " | 0.10 | 0.021 |
| Silica gel | | 0.03 | 2.3 | 17.1 | 460 | 97.05 |
| " | | 1.4 | " | " | 460 | 97.05 |
| " | | 3.0 | " | " | 460 | 97.05 |
| " | | 4.8 | " | " | 410 | 86.50 |
| Activated alumina | | 0.03 | " | 4.68 | 470 | 99.16 |
| " | | 1.4 | " | " | 310 | 65.40 |
| " | | 3.0 | " | " | 240 | 50.63 |
| " | | 4.8 | " | " | 210 | 44.30 |
| Catalyst of this invention | (5) | 0.03 | " | 17.1 | 1.45 | 0.306 |
| " | (6) | 1.4 | " | " | 0.45 | 0.095 |
| " | (7) | 3.0 | " | " | 0.30 | 0.063 |
| " | (8) | 4.8 | " | " | 0.30 | 0.063 |
| " | (9) | 0.03 | " | 10.3 | 0.17 | 0.036 |
| " | (10) | 1.4 | " | " | 0.12 | 0.025 |
| " | (11) | 3.0 | " | " | 0.12 | 0.025 |
| " | (12) | 4.8 | " | " | 0.12 | 0.025 |
| " | (13) | 0.03 | 11.3 | 51.4 | 11.5 | 2.426 |
| " | (14) | 1.4 | " | " | 4.5 | 0.949 |
| " | (15) | 3.0 | " | " | 3.1 | 0.654 |
| " | (16) | 4.8 | " | " | 3.0 | 0.633 |

As is clearly seen from the results above, when the known silica gel or activated alumina was employed, the NO concentration at the outlet was usually greater than several hundreds ppm and at best, several tens ppm. On the other hand, using the novel catalysts of the present invention removal of NO was substantially completely accomplished. It is also seen from the results above that NO was almost completely removed even in an oxygen content of 0.03%.

When the steam pressure of the gas was adjusted to a dew point of −20° C, substantially the same results were obtained. When the dew point was 0° C, the NO concentration at the outlet had a tendency to increase, especially in the case of continuous operation as in Example 2 below. When the dew point was +20° C, removal of NO was unsatisfactory.

When a tuff having the X-ray diffraction pattern shown in Table II hereinbefore was used, the same results were obtained.

EXAMPLE 2

In Example 1, the designation "catalyst of this invention (7)", the operations were continuously performed for 6 hours. The NO concentration in the outlet gas was still maintained at 0.30 ppm and the removal rate of NO was 99.94%. The desorption of the adsorbed substances can be conducted by heating, pressure-reducing, water washing, etc.

EXAMPLE 3

An exhaust gas from a sintering furnace was treated using the oxidation catalyst prepared from a the tuff having the X-ray diffraction pattern shown in Table I at a gas velocity of 400 m³/hr. The dew point of the exhaust gas was +40 to +44° C: At the inlet of the adsorption column, the dew point of the gas mixture was dropped to −50° C. The composition of the gas mixture was as follows:

| | |
|---|---|
| $NO_x$ (almost NO) | 200 ppm |
| $O_2$ | 10 % |

-continued

| | |
|---|---|
| $SO_2$ | 2000 ppm |

The removal rate of NO was more than 99%, at the same time $NO_2$ and $SO_2$ gas was eliminated almost completely.

EXAMPLE 4

The exhaust gas of Example 3 was treated using an oxidation catalyst prepared from a tuff having the X-ray diffraction pattern shown in Table II. The same results as in Example 3 were obtained after continuous operation for about 30 hours.

Thus, by using the inventive catalysts of this application, it is possible to eliminate sufficiently the $NO_x$ in an exhaust gas, for example, from a sintering furnace satisfying the present as well as future air pollution prevention standards.

What is claimed is:

1. An oxidation catalyst for the removal of nitrogen monoxide in exhaust gas, said catalyst being obtained by a procedure comprising heating a naturally occurring inorganic material at a temperature of from 100° to 900° C, said naturally occurring inorganic material being a tuff consisting essentially of $SiO_2$, $Al_2O_3$ and $H_2O$, containing 1 to 10% by weight of total of an alkaline metal oxide and an alkaline earth metal oxide and having the X-ray diffraction pattern shown in Table I or Table II, said inorganic material having a mesh size of less than 50 mesh.

2. An oxidation catalyst according to claim 1 wherein said inorganic material has been reduced to a mesh size of 3–5.

3. An oxidation catalyst according to claim 1 in which said naturally occurring inorganic material is heated at a temperature of between 200° C to 700° C.

4. An oxidation catalyst according to claim 3 wherein said naturally occurring inorganic material is heated at a temperature of between 200° to 600° C.

5. An oxidation catalyst according to claim 1 wherein said alkaline metal oxide and alkaline earth metal oxides are $K_2O$, $Na_2O$ and $CaO$.

* * * * *